United States Patent [19]
Nitta et al.

[11] Patent Number: 5,223,034
[45] Date of Patent: * Jun. 29, 1993

[54] WEATHER-RESISTANT, PEARLESCENT PIGMENT AND PROCESS FOR PRODUCING THE SAME IN THE PRESENCE OF HYPOPHOSPHITE

[75] Inventors: Katsuhisa Nitta, Fukushima; Isao Suzuki, Funabashi, both of Japan

[73] Assignee: Merck Patent Gesellschaft mit beschrankter Haftung, Darmstadt, Fed. Rep. of Germany

[*] Notice: The portion of the term of this patent subsequent to May 9, 2006 has been disclaimed.

[21] Appl. No.: 696,268

[22] Filed: May 1, 1991

Related U.S. Application Data

[63] Continuation of Ser. No. 353,834, May 18, 1989, abandoned.

[30] Foreign Application Priority Data

May 19, 1988 [JP] Japan .................. 63-120689

[51] Int. Cl.$^5$ .................. C04B 14/20; C04B 14/30
[52] U.S. Cl. .................. 106/417; 106/450; 106/480
[58] Field of Search .............. 106/417, 450, 480, 503

[56] References Cited

U.S. PATENT DOCUMENTS

| | | | |
|---|---|---|---|
| 3,087,828 | 4/1963 | Linton | 106/417 |
| 3,331,699 | 7/1967 | Marshall et al. | 106/450 |
| 3,342,617 | 9/1967 | Jackson | 106/417 |
| 3,536,520 | 10/1970 | Marshall | 106/417 |
| 3,832,208 | 8/1974 | Jackson | 106/441 |
| 3,874,890 | 4/1975 | Bernhard et al. | 106/439 |
| 3,892,577 | 7/1975 | Sugahara et al. | 106/14.12 |
| 3,926,659 | 12/1975 | Bernhard et al. | 106/439 |
| 4,457,784 | 7/1984 | Bernhard | 106/417 |
| 4,482,389 | 11/1984 | Franz et al. | 106/417 |
| 4,525,425 | 6/1985 | Church | 427/372.2 |
| 4,565,581 | 1/1986 | Bernhard | 106/417 |
| 4,828,623 | 5/1989 | Nitta et al. | 106/417 |
| 5,022,923 | 6/1991 | Rau et al. | 106/417 |

FOREIGN PATENT DOCUMENTS

| | | | |
|---|---|---|---|
| 0082986 | 7/1983 | European Pat. Off. | 106/417 |
| 02628353 | 12/1977 | Fed. Rep. of Germany | 106/417 |
| 0023643 | 1/1961 | Japan | 106/417 |
| 0162473 | 12/1980 | Japan | 106/480 |
| 3043962 | 2/1988 | Japan | 106/417 |

OTHER PUBLICATIONS

Shaw "New Approach to Ceramic Colors" *Ceramic Industry* Apr. 1962 pp. 85-124.

Blumenthal "Zirconium Compounds in Water Repellents . . . " *Industrial and Engineering Chem.* Apr. 1950 pp. 640-642.

*Primary Examiner*—Paul Lieberman
*Assistant Examiner*—John Boyd
*Attorney, Agent, or Firm*—Millen, White, Zelano & Branigan

[57] ABSTRACT

The invention relates to a weather-resistant, pearlescent pigment which comprises mica flakes coated with a metal oxide as base material, (a) hydrated zirconium oxide formed by hydrolysis of a zirconyl compound in the presence of a hypophosphite, and (b) a hydrated metal oxide (or oxides) formed by hydrolysis of a water-soluble compound (or compounds) of at least one member selected from the group consisting of cobalt, manganese and cerium, said components (a) and (b) being deposited on the surface of said base material.

12 Claims, No Drawings

WEATHER-RESISTANT, PEARLESCENT PIGMENT AND PROCESS FOR PRODUCING THE SAME IN THE PRESENCE OF HYPOPHOSPHITE

This application is a continuation of application Ser. No. 07/353,834, filed May 18, 1989, abandoned.

BACKGROUND OF THE INVENTION

We formerly succeeded in developing water-resistant pearlescent pigment that can be applied to paint for outdoor use, particularly to paint for exterior coating of cars (Japanese Patent Application No. 276687/1986, equivalent to allowed U.S. application Ser. No. 07/123,474, filed Nov. 20, 1987).

Paint for outdoor use, for example, paint suitable for exterior coating of cars, must be such that the coated film shows no change in appearance when exposed to various weather conditions.

It is known that particles of titanium dioxide, if contained in a coated film, tend to induce oxidative decomposition of the polymer that constitutes the coated film by the action of near ultraviolet rays and moisture, thus leading to chalking. To suppress such an activity of titanium dioxide, many techniques have been proposed and adopted in commercial products, in which titanium dioxide is doped or coated with a chromium, silicon, aluminum, zinc, phosphorus or zirconium compound, either alone or in combination.

Aluminum flake pigment is also used in paint for exterior coating of cars, and it is known that paint of this type also tends to undergo changes in appearance when exposed to various weather conditions. Known methods for evaluating the tolerance of pigment to weather conditions, are outdoor exposure tests and accelerated weathering tests. When the water resistance alone is to be evaluated, coated boards are exposed to an atmosphere of high temperature and humidity (blister box test) or immersed in hot water (hot-water immersion test) to examine the resulting deterioration in gloss and changes in color.

It is generally accepted that such deterioration in gloss and changes in color are a result of light scattering caused by micropores in the coated film, which have been formed by permeation of water or steam to produce minute blisters, followed by evaporation of the water.

Pearlescent pigments comprising metal-oxide-coated mica (mica flakes with their surface coated with a metal oxide, such as titanium oxide, iron oxide and a combination thereof) have been widely employed in notions for daily use, toys, packaging materials and many other uses as colorants for paint, printing ink and plastics, and their application has recently been expanded to outdoor uses, such as exterior coating for cars and construction materials.

However, conventional pearlescent pigments, when submitted to the water resistance tests (blister box and hot-water immersion tests), show deterioration in gloss and changes in color as in the case with aluminum flake pigments, and hence it has been pointed out that some modification is required for pigments of this type to be applied to paint for outdoor use, particularly to paint for exterior coating of cars.

The pigment of the new type in U.S. Ser. No. 07/127,474 shows excellent gloss and water resistance without using any chromium compound, but is still insufficient in resistance to light. Application of this technique to mica flakes coated with metal oxides including titanium dioxide failed to fully suppress the adverse activity of titanium dioxide as mentioned above; coated film containing the thus-obtained pigment showed unsatisfactory results when subjected to tests involving light irradiation, such as outdoor exposure tests and accelerated weathering tests.

In the automotive industry, there has been an increasing demand for pearlescent gloss finish, and this requires the development of new pearlescent pigments for outdoor paint that contain no chromium compounds and show high gloss and outstanding weatherability.

This invention provides novel, weather-resistant pearlescent pigments that will meet the above-mentioned requirements, and processes for producing the same.

SUMMARY OF THE INVENTION

This invention relates to pearlescent pigments composed of mica flakes coated with a metal oxide as base material, and a second coating comprising hydrated zirconium oxide and a hydrated oxide (or oxides) of at least one metal selected from the group consisting of cobalt, manganese and cerium, and to processes for producing the same.

More particularly, it relates to novel, weather-resistant pearlescent pigment and to processes for producing the same, in which this novel pearlescent pigment comprises mica flakes coated with a metal oxide as base material, (a) hydrated zirconium oxide formed by hydrolysis of a zirconyl compound in the presence of a hypophosphite, and (b) a hydrated metal oxide (or oxides) formed by hydrolysis of a water-soluble compound (or compounds) of at least one member selected from the group consisting of cobalt, manganese and cerium, said components (a) and (b) being deposited on the surface of said base material.

DETAILED DISCLOSURE OF THE INVENTION

We have discovered that a coating comprising hydrated zirconium oxide formed under specific conditions and a hydrated oxide (or oxides) of at least one metal selected from the group consisting of cobalt, manganese and cerium, show sufficiently high weatherability as required of the above-mentioned pearlescent pigment.

Noting that a coating of hydrated zirconium oxide formed under specific conditions alone was insufficient to give satisfactory results in outdoor exposure tests and accelerated weatherability tests, we further continued studies to overcome this difficulty and succeeded in providing the novel, weather-resistant pearlescent pigments of this invention.

The weather-resistant, pearlescent pigments of this invention comprise mica flakes coated with a metal oxide as base material, (a) hydrated zirconium oxide formed by hydrolysis of a zirconyl compound in the presence of a hypophosphite, and (b) a hydrated metal oxide (or oxides) formed by hydrolysis of a water-soluble compound (or compounds) of at least one member selected from the group consisting of cobalt, manganese and cerium, said components (a) and (b) being deposited on the surface of said base material. This new pearlescent pigment, when applied to paint for outdoor use, gives coated film with outstanding weatherability.

The novel, weather-resistant pearlescent pigment of this invention can be produced according to the methods described below.

Mica flakes coated with a metal oxide are used as base material. An aqueous slurry of this base material is treated, at a temperature in the range from 50° C. to its boiling point in the presence of a hypophosphite, with a salt of zirconium that can be hydrolyzed into hydrated zirconium oxide and with a water-soluble compound (or compounds) of at least one member selected from the group consisting of cobalt, manganese and cerium that can be hydrolyzed into the corresponding hydrated metal oxide (or oxides), thereby causing the hydrated metal oxides to deposit on the surface of said base material. In this case, all of the hydrated metal oxides may be formed simultaneously, or part or all of the individual oxides may be formed separately.

The pearlescent base pigment can thus be coated with hydrated zirconium oxide and a hydrated metal oxide (or oxide) of at least one member selected from the group consisting of cobalt, manganese and cerium, with no adverse effect upon its dispersibility, giving new pearlescent pigment which shows outstanding weatherability when applied to paint for outdoor use.

Any type of commonly employed metal-oxide-coated mica flakes may be used as the base material in the manufacturing processes of this invention. As the metal oxide may be mentioned oxides of titanium, iron, tin, chromium and zirconium, and any combinations of these metal oxides. Of these, the oxide of iron may be ferrous oxide, ferric oxide or a mixture thereof. Preferably used are mica flakes coated with rutile titanium dioxide and those coated with iron oxide containing titanium oxide. These are well-known pigments disclosed in U.S. Pat. Nos. 3 553 001, 3 711 308, 3 874 890, 3 926 659, 3,951,679, 4,084,983, 4,086,100 and 4,128,435.

These base pigments, modified by treatment with a compound of silicon, aluminum or zinc for higher stability, may also be used for the purpose of this invention.

Mica flakes generally have a diameter of 2 to 200 $\mu$m and a thickness of about 0.1 to 5 $\mu$m, but those about 5 to 50 $\mu$m in diameter and about 0.2 to 0.9 $\mu$m in thickness are preferably used in the processes of this invention.

As examples of the water-soluble zirconium salts capable of forming hydrated zirconium oxide by hydrolysis, there may be mentioned normal salts such as $ZrCl_4$, $Zr(NO_3)_4.5H_2O$ and $Zr(SO_4)_2.4H_2O$, and zirconyl salts such as $ZrOCl_2.8H_2O$, $ZrO(NO_3)_2.2H_2O$, $ZrOSO_4.4H_2O$ and $ZrO(CH_3COO)_2$. Of these, $ZrOCl_2.8H_2O$ is the most preferred because of the ease of handling and availability.

Illustrative water-soluble hypophosphites include $HPH_2O_2$, $NaH_2PO_2.H_2O$, $(NH^*)H_2PO_2$, $KH_2PO_2$, $Ca(H_2PO_2)_2$, $Mg(H_2PO_2)_2$, $Co(_2PO_2)_2.6H_2O$, $Mn(H_2PO_2)_2.H_2O$, $Zn(H_2PO_2)_2.6H_2O$ and $Pb(H_2PO_2)_2$. Of these $NaH_2PO_2.H_2O$ is the most preferred because of the high solubility, nontoxicity and ease of availability.

As can be seen, the precise natures of the anion of the Zr-containing salt and the cation of the hypophosphite are not critical and need only be compatible with the underlying process.

Examples of the water-soluble manganese compounds are $CoCl_2.4H_2O$, $Co(NO_3)_2.6H_2O$, $CoSO_4.7H_2O$ and $Co(CH_3COO)_2$.

Examples of the water-soluble manganese compounds are $MnCl_2.4H_2O$, $Mn(NO_3)_2.nH_2O$, $MnSO_4.4-5H_2O$ and $Mn(CH_3COO)_2.4H_2O$.

$CeCl_3.7H_2O$, $Ce(NO_3)_3.6H_2O$, $Ce_2(SO_4)_3.8H_2O$ and $Ce(SO_4)_2.4H_2O$ are examples of the water-soluble cerium compounds.

In a preferred embodiment of the processes for producing pearlescent pigment of this invention, an aqueous solution of a hypophosphite is slowly added to an aqueous solution of a zirconium or zirconyl compound at a temperature lower than 50° C. with stirring so as not to form white precipitate, and hydrochloric acid is added to the clear solution thus obtained, affording a mixed solution of the hypophosphite and the zirconium or zirconyl salt. Separately, a base material is slurried in water to a concentration of 5 to 15 weight %, the slurry is then heated with stirring to a temperature from 50° C. to its boiling point, and its pH is adjusted to 2 to 6 by addition of hydrochloric acid or the like. To this slurry, is added an aqueous solution of a water-soluble compound (or compounds) of at least one member selected from cobalt, manganese and cerium as mentioned above. The solution of hypophosphite and zirconium (or zirconyl) compound prepared above is then added dropwise with stirring at a constant rate while maintaining the pH at a constant level within the range from 2 to 6 by addition of an aqueous alkaline solution (e.g., a caustic soda solution), and the mixture is stirred at that temperature for at least 30 minutes. After raising the pH to a level of 5 to 9 by addition of an aqueous alkaline solution (e.g., a caustic soda solution), stirring is further continued at that temperature for at least 30 minutes, and the reaction product is collected by filtration, washed with water and dried at 80° to 130° C.

In a second embodiment of the manufacturing processes of this invention, an aqueous solution of hypophosphite is slowly added to an aqueous solution of a zirconium or zirconyl compound at a temperature lower than 50° C. with stirring so as not to form white precipitate, and hydrochloric acid is added to this clear solution to afford a mixed solution of the hypophosphite and the zirconium or zirconyl salt . Separately, a base material is slurried in water to a concentration of 5 to 15 weight %, the slurry is then heated with stirring to a temperature from 50° C. to its boiling point, and its pH is adjusted to 2 to 6 by addition of hydrochloric acid or the like. To this slurry is added dropwise with stirring the solution of a hypophosphite and a zirconium (or zirconyl) compound prepared above at a constant rate while maintaining the pH at a constant level within the range from 2 to 6 by addition of an aqueous alkaline solution (e.g., a caustic soda solution), and the mixture is stirred at that temperature for at least 30 minutes. An aqueous solution of a water-soluble compound (or compounds) of at least one member selected from cobalt, manganese and cerium as mentioned above is then added, the pH is raised to a level of 4 to 9 by addition of an aqueous alkaline solution (e.g., caustic soda solution), stirring is further continued at that temperature for at least 30 minutes and the reaction product is collected by filtration, washed with water and dried at 80° to 130° C.

In a third embodiment of the manufacturing processes of this invention, base material is slurried in water to a concentration of 5 to 15 weight %, the slurry is then heated with stirring to a temperature from 50° C. to its boiling point, and its pH is adjusted to 2 to 6 by addition of hydrochloric acid or the like. To this slurry is added an aqueous solution of a water-soluble compound (or compounds) of at least one member selected from cobalt manganese and cerium as mentioned above the pH is then raised to a level of 4 to 9 by addition of an aqueous alkaline solution (e.g., a caustic ssoda solution), and stirring is continued at that temperature for at least 30 minutes. Separately, an aqueous solution of a hypophosphite is slowly added to an aqueous solution of a zirconium or zirconyl compound at a temperature lower than 50° C. with stirring so as not to form white precipitate, and hydrochloric acid is added to this clear solution to afford a mixed solution of the hypophosphite and the zirconium or zirconyl salt. This solution is added dropwise with stirring to the slurry prepared above at a constant rate while maintaining the pH at a constant level within the range from 2 to 6 by addition of an aqueous alkaline solution (e.g., a caustic soda solution), and the mixture is stirred at that temperature for at least 30 minutes. After raising the pH to a level of 5 to 9 by addition of an aqueous alkaline solution (e.g., an aqueous solution of caustic soda), stirring is continued at that temperature for at least 30 minutes, and the reaction product is collected by filtration, washed with water and dried at 80° to 130° C.

In the processes for producing weather-resistant pearlescent pigment of this invention, methods other than that described above may also be adopted for the formation of hydrated zirconium oxide. For example, an aqueous slurry of base material is adjusted to pH 1 to 2 with hydrochloric acid or the like, an aqueous solution of a zirconium or zirconyl salt is added with stirring, and then an aqueous solution of a hypophosphite is slowly added while maintaining the temperature in the range from 50° C. to the boiling point of said slurry. Stirring is continued at that temperature for some time, and an aqueous alkaline solution (e.g., a caustic soda solution) is slowly added by means of a metering feeder to raise the pH of slurry to a level of 4 to 9.

In another method, an aqueous solution of a zirconium or zirconyl salt and an aqueous solution of a hypophosphite are separately added dropwise with stirring each at a constant rate and at a definite proportion to an aqueous slurry of base material while holding the temperature within the range from 50° C. to the boiling point of said slurry and maintaining the pH at a constant level within the range of 2 to 6 by addition of an aqueous alkaline solution (e.g., a caustic soda solution). Stirring is continued at that temperature for at least 30 minutes, and the pH is raised to a level of 5 to 9 by addition of an aqueous alkaline solution (e.g., a caustic soda solution).

In the manufacturing processes of this invention, the water-soluble salt capable of forming hydrated zirconium oxide is used generally in an amount of 0.001 to 0.05 mole, preferably 0.005 to 0.03 mole, per 100 g of the base pigment, and the hypophosphite is used in such an amount that the atomic ratio of phosphorus to zirconium will be in the range from 1:2 to 10:1, preferably from 1:1 to 3:1.

The amount of water-soluble compound of cobalt, manganese or cerium, when used alone, is 0.003 to 0.03 mole, preferably 0.007 to 0.015 mole, for cobalt compound: 0.001 to 0.01 mole, preferably 0.003 to 0.007 mole, for manganese compound; and 0.0006 to 0.006 mole, preferably 0.001 to 0.004 mole, for cerium compound (each per 100 g of base pigment).

The amount of hydrated zirconium oxide deposited on the pigment substrate is typically about 0.1–6% by weight based on the pigment and calculated as $ZrO_2$, preferably about 0.5–4% by weight.

The hydrated oxide of cobalt assumes a blue to green color, that of manganese a brown color, and that of cerium white to faint yellow color. Hence, various desired colors be obtained by using these oxides either alone or in combination.

In the above-mentioned manufacturing processes, the solution of zirconium or zirconyl salt may also contain other types of metal salts, such as a water-soluble salt of aluminum, zinc, tin, cobalt, manganese and cerium. In addition, an aluminate, zincate, silicate or phosphate may also be added to the aqueous solution of hypophosphite and/or to the aqueous alkaline solution in an amount that allows the formation of hydrated zirconium oxide.

Furthermore, the base pigment on which hydrated zirconium oxide has been deposited may be treated with a coupling agent (e.g., a silane coupling agent) to further improve the water resistance of the pearlescent pigment of this invention and to ensure its higher affinity for coating materials.

Silane coupling agents are known as compounds which act upon the interface between an organic material and an inorganic material, thereby enhancing the affinity between the two.

Illustrative examples of silane coupling agents include γ-(2-aminoethyl)aminopropyl-trimethoxysilane, γ-(2-aminoethyl)aminopropyl-methyl-dimethoxysilane, γ-methacryloxypropyl-methyl-trimethoxysilane, γ-glycidoxypropyltrimethoxysilane, γ-mercaptopropyl-trimethoxysilane, vinyltriacetoxysilane, γ-chloropropyltrimethoxysilane, vinyltrimethoxysilane, octadecyldimethyl-[3-(trimethoxysilyl)-propyl]ammonium chloride, γ-mercaptopropyl-methyl-dimethoxysilane, methyl-trichlorosilane, dimethyl-dichlorosilane and trimethyl-chlorosilane. In actual practice, a compound having a functional group suited for the organic vehicle to be combined with the pigment, under consideration is selected. For example, γ-(2-aminoethyl)aminopropyltrimethoxysilane, γ-methacryloxypropyl-trimethoxysilane and γ-glycidoxypropyl-trimethoxysilane are suitable for acrylic vehicles.

The treatment is effected by adding a solution of a silane coupling agent in water, or in a mixture of water and an organic solvent, to an aqueous slurry of pearlescent pigment coated with hydrated zirconium oxide, stirring the mixture for at least 15 minutes, and collected the treated powder by filtration, followed by washing with water and drying at 80° to 130° C.

The treating solution used above should contain 0.1 to 3%, preferably 0.5 to 2%, of the silane coupling agent based on the weight of pigment being treated, and the concentration of the agent should be in the range from 0.1 to 5 weight %.

The pearlescent pigment of this invention thus prepared shows weatherability sufficiently high to be employed as a colorant of paint for outdoor use, particularly exterior paint for case, and its dispersibility remains high, with no adverse effect at all upon the color tone and gloss of the base pigment.

The pearlescent pigment of this invention can be applied not only to paint for outdoor use, but also to many other materials used outdoors, such as plastics, and as a colorant for printing inks.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application Japanese No. 63-120689 filed May 19, 1988, are hereby incorporated by reference.

The properties of pigments obtained in these Examples are listed in Table 1 shown later.

EXAMPLES

Example 1

A 1 wt-% aqueous solution containing 1.88 g sodium hypophosphite ($NaH_2PO_2.H_2O$) was added at room temperature with stirring to a 10 wt-% aqueous solution containing 2.88 g of zirconium oxychloride ($ZrOCl_2.8H_2O$) so slowly as not to form any white precipitate. To the clear solution thus obtained, as added 30 g of 3.5 wt-% hydrochloric acid, affording a mixed solution of zirconium oxychloride and sodium hypophosphite.

Separately, 50 g of mica flakes coated with rutile titanium dioxide (about 48% based on the total weight) having a particle size of 10 to 50 μ and showing blue reflection color and yellow transmission color (Triodin 225 Rutile Blue; product of E. Merck) were suspended in 500 ml water, and the slurry thus obtained was heated to 75° C. with stirring. The pH was adjusted to 3 by addition of hydrochloric acid, 1 wt-% aqueous solution containing 0.567 g cerium chloride ($CeCl_3.7H_2O$) was added, and then the mixed solution of zirconium oxychloride and sodium hypophosphite prepared above was added dropwise at a rate of 4 ml/min while maintaining the pH at 3 by addition of 1 wt-% aqueous solution of caustic soda. Stirring was continued at 75° C. for 30 minutes.

The solid matters were collected by filtration, washed with water and dried at 120° C.

The solid product thus obtained Was grayish-white, pearlescent pigment with good dispersibility showing blue reflection color and yellow transmission color.

Example 2

Fifty grams of mica flakes coated with rutile titanium dioxide (the same type as used in Example 1) were treated in much the same manner as in Example 1) were treated in much the same manner as in Example 1, except that 0.756 g cobalt sulfate ($CoSO_4.7H_2O$) was used in place of 0.567 g cerium chloride ($CeCl_3.7H_2$).

The solid product thus obtained was greenish-white, pearlescent pigment with good dispersibility showing blue reflection color and yellow transmission color.

Example 3

Fifty grams of mica flakes coated with rutile titanium dioxide (the same type as used in Example 1) were treated in much the same manner as in Example 1, except that 0.625 g manganese sulfate ($MnSO_4.4-5H_2O$) was used in place of 0.567 g cerium chloride ($CeCl_3.7H_2O$).

The solid product thus obtained was orangy-white, pearlescent pigment with good dispersibility showing blue reflection color and yellow transmission color.

Example 4

Fifty grams of mica flakes coated with rutile titanium dioxide (the same type as used in Example 1) were treated in much the same manner as in Example 1, except that 0.0625 g manganese sulfate ($MnSO_4.4-5H_2O$) and 0.454 g cobalt sulfate ($CoSO_4.7H_2O$) were used in place of 0.567 g cerium chloride ($CeCl_3.7H_2O$).

The solid product thus obtained was faint orangy-white, pearlescent pigment with good dispersibility showing blue reflection color and yellow transmission color.

Example 5

A 1 wt-% aqueous solution containing 1.88 g sodium hypophosphite ($NaH_2PO_2.H_2O$) was added at room temperature with stirring to a 10 wt-% aqueous solution containing 2.88 g zirconium oxychloride ($ZrOCl_2.8HO$) so slowly as not to form any white precipitate. To the clear solution thus obtained, was added 30 g of 3.5 wt-% hydrochloric acid, affording a mixed solution of zirconium oxychloride and sodium hypophosphite.

Separately, 50 g of mica flakes coated with rutile titanium dioxide (the same type as used in Example 1) were suspended in 500 ml water, and the slurry thus obtained was heated to 75° C. with stirring. After adjusting the pH to 3 by addition of hydrochloric acid, the mixed solution of zirconium oxychloride and sodium hypophosphite prepared above was added dropwise at a rate of 4 ml/min while maintaining the pH at 3 by addition of 1 wt-% aqueous solution of caustic soda. Stirring was continued at 75° C. for 30 minutes, 1 wt-% aqueous solution containing 0.567 g cerium chloride ($CeCl_3.7H_2O$) was added, then 1 wt-% aqueous solution of caustic soda was added dropwise at a rate of 2.4 ml/min until the pH reached 7.2, and stirring was further continued at 75° C. for 30 minutes.

The solid matters were collected by filtration, washed with water and dried at 120° C.

The solid product thus obtained was grayish-white, pearlescent pigment with good dispersibility showing blue reflection color and yellow transmission color.

Example 6

Fifty grams of mica flakes coated with rutile titanium dioxide (the same type as used in Example 1) were suspended in 500 ml water, and the slurry thus obtained was heated to 75° C. with stirring. After adjusting the pH to 3 by addition of hydrochloric acid, 1 wt-% aqueous solution containing 0.567 g cerium chloride ($CeCl_3.7H_2O$) was added, then 1 wt-% aqueous solution of caustic soda was added dropwise at a rate of 2.4 ml/min until the pH reached 7.2, and stirring was further continued at 75° C. for 30 minutes.

Separately, 1 wt-% aqueous solution containing 1.88 g sodium hypophosphite ($NaH_2PO_2.H_2O$) was added at room temperature with stirring to a 10 wt-% aqueous solution containing 2.88 g of zirconium oxychloride ($ZrOCl_2.8H_2O$) so slowly as not to form any white precipitate. To the clear solution thus obtained, was added 30 g of 3.5 wt-% hydrochloric acid, affording a mixed solution of zirconium oxychloride and sodium hypophosphite. This solution was added dropwise to the slurry prepared above at a rate of 4 ml/min while maintaining the pH at 3 by addition of 1 wt-% aqueous solution of caustic soda, stirring was continued at 75 for 30 minutes, 1 wt-% aqueous solution of caustic soda was added dropwise at a rate of 2.4 ml/min until the pH reached 7.2, and stirring was further continued at 75° C. for 3 minutes.

The solid matters were collected by filtration washed with water and dried at 120° C.

The solid product thus obtained was grayish-white, pearlescent pigment with good dispersibility showing blue reflection color and yellow transmission color.

Example 7

Fifty grams of mica flakes coated with rutile titanium dioxide (the same type as used in Example 1) were suspended in 500 ml water, and the slurry thus obtained was heated to 75° C. with stirring. After adjusting the pH to 1.6 by addition of hydrochloric acid, 1 wt-% aqueous solution containing 0.567 g cerium chloride ($CeCl_3.7H_2O$) and 10 wt-% aqueous solution containing 2.88 g zirconium oxychloride ($ZrOCl_2.8H_2O$) were added. A 1 wt-% aqueous solution containing 1.88 g sodium hypophosphite ($NaH_2PO_2.H_2O$) was then added with stirring at a rate of 3.1 ml/min, stirring was continued at 75° C. for 30 minutes, 1 wt-% aqueous solution of caustic soda was added dropwise at a rate of 5.3 ml/min until the pH reached 7.2, and stirring was further continued at 75° C. for 30 minutes.

The solid matters were collected by filtration, washed with water and dried at 120° C.

The solid product thus obtained was grayish-white, pearlescent pigment with good dispersibility showing blue reflection color and yellow transmission color.

Example 8

Fifty grams of mica flakes coated with rutile titanium dioxide (the same type as used in Example 1) were treated in much the same manner as in Example 1. To the slurry of solid product before filtration, was added 1 wt-% aqueous solution containing 0.5 g of γ-glycidoxypropyl-trimethoxy-silane (a silane coupling agent, SH6040; product of Toray Silicone Inc.), and the mixture was stirred at 75° C. for 30 minutes.

The solid matters were collected by filtration and dried at 120° C.

The solid product thus obtained was grayish-white, pearlescent pigment with good dispersibility showing blue reflection color and yellow transmission color.

Streamlines were observed when this pigment was suspended in an organic solvent of low polarity (e.g., toluene), indicating its enhanced affinity for organic substances.

Example 9

Fifty grams of mica flakes coated with rutile titanium dioxide (about 28% based on the total weight) having a particle size of 10 to 50 μ and showing grayish-white base color and white reflection color (Triodin 103 Sterling Silver; product of E. Merck) were treated in the same manner as in Example 8.

The solid product thus obtained was grayish-white, pearlescent pigment with good dispersibility showing white reflection color.

Streamlines were observed when this pigment was suspended in an organic solvent of low polarity (e.g., toluene), indicating its enhanced affinity for organic substances.

Example 10

Fifty grams of mica flakes coated with titanium dioxide and iron oxide (approximately 36% and 8%, respectively, based on the total weight) having a particle size of 10 to 50 μ and showing yellow base color and gold reflection color (Triodin 300 Gold pearl; product of E. Merck) were suspended in 500 ml water, and the slurry thus obtained was heated to 75° C. with stirring. After adjusting the pH to 3 by addition of hydrochloric acid, 1 wt-% aqueous solution containing 0.567 g cerium chloride ($CeCl_3.7H_2O$) and 1 wt-% aqueous solution containing 0.41 g zinc chloride ($ZnCl_2$) were added.

Separately, a 1 wt-% aqueous solution containing 1.88 g sodium hypophosphite ($NaH_2PO_2.H_2O$) was added at room temperature with stirring to a 10 wt-% aqueous solution containing 2.88 g zirconium oxychloride ($ZrOCl_2.8H_2O$) so slowly as not to form any white precipitate. To the clear solution thus obtained, was added 30 g of 3.5 wt-% hydrochloricacid, affording a mixed solution of zirconium oxychloride and sodium hypophosphite. This solution was added dropwise to the slurry prepared above at a rate of 4 ml/min while maintaining the pH at 3 by addition of 1 wt-% aqueous solution of caustic soda, stirring was continued at 75° C. for 30 minutes, 1 wt-% aqueous solution of caustic soda Was added dropwise at a rate of 2.4 ml/min until the pH reached 7.2, and stirring was further continued at 75° C. for 30 minutes. To the slurry thus obtained, was added 1 wt-% aqueous solution of γ-(2-aminoethyl)aminopropyltrimethoxy silane (a silane coupling agent, SH6020; product of Toray Silicone Inc.), and stirring was continued at 75° C. for 30 minutes.

The solid matters were collected by filtration, washed with water and dried at 120° C.

The solid product thus obtained was yellow, pearlescent pigment with good dispersibility showing gold reflection color.

Streamlines were observed when this pigment was suspended in an organic solvent of low polarity (e.g., toluene), indicating its enhanced affinity for organic substances.

Comparative Example 1 (dispersibility when hypophosphite is not used)

Fifty grams of mica flakes coated with rutile titanium dioxide (the same type as used in Example 1) was suspended in 500 ml water, the slurry thus obtained was heated to 75° with stirring, the pH was adjusted to 1.6 by addition of hydrochloric acid, and 10 wt-% aqueous solution containing 2.88 g zirconium oxychloride ($ZrOCL_2.8H_2O$) was added. To the resulting slurry, was added dropwise 1 wt-% aqueous caustic soda solution with stirring at a rate of 5.3 ml/min until the pH reached 7.2, and stirring was continued at 75° C. for 30 minutes.

The solid product was collected by filtration, washed with water and dried at 120° C., giving grayish-white powder containing small lumps.

Comparative Example 2 (dispersibility when no cerium compound is used)

Fifty grams of mica flakes coated with rutile titanium dioxide (the same type used in Example 1) was suspended in 500 ml water, the slurry thus obtained was heated to 75° C. with stirring, the pH was adjusted to 1.6 by addition of hydrochloric acid, and 10 wt-% aqueous solution containing 2.88 g zirconium oxychloride ($ZrOCl_2.8H_2O$) was added. To the resulting slurry, was added dropwise with stirring a 1 wt-% aqueous solution containing 1.88 g sodium hypophosphite ($NaH_2PO_2.H_2O$) at a rate of 3.1 ml/min, and the mixture was stirred at 75° C. for 30 minutes. A 1 wt-% aqueous caustic soda solution was then added with stirring at a rate of 5.3 ml/min until the pH reached 7.2, and stirring was further continued at 75° C. for 30 minutes. A 1 wt-% aqueous solution containing 0.5 g γ-glycidoxypropyltrimethoxysilane was then added, and the mixture was stirred at 75° C. for 30 minutes.

The solid matters were collected by filtration, washed with water and dried at 120° C.

The solid product thus obtained was grayish-white, pearlescent pigment with good dispersibility showing blue reflection color and yellow transmission color.

Test Examples

The pigments prepared in the above Examples and Comparative Examples were evaluated according to the methods described below. The results obtained are summarized in Table.

Testing of Water Resistance (Hot-water Immersion Test)

One part by weight of a pigment sample was mixed with nine parts of a thermosetting acrylic/melamine resin (a 7:3 mixture of Acrydic 47-712 and Superbeckamine G821-60; product of Dainippon Ink & Chemicals, Inc.). Separately, a black enamel (Superlac F-47; product of Nippon Paint Co., Ltd.) was coated on a steel plate previously treated with zinc phosphate (7 cm×15 cm) to a thickness of about 25 μm (on dry basis) and baked at 150° C. for 20 minutes. On this enamel-coated plate, was coated the pigmented thermosetting resin prepared above to a thickness of about 20 μm (on dry basis), followed by wet-on-wet application of a clear topcoating (a 7:3 mixture of Acrydic 44-179 and Superbeckamine L17-60; product of Dainippon Ink & Chemicals, Inc.) to a thickness of about 30 μm (on dry basis) and baking at 140° C. for 18 minutes.

The test plate thus prepared was immersed in 80° C. hot water for three hours, the hot water was allowed to cool slowly to room temperature, the treated plate was taken out, and the changes in appearance were evaluated by visual observation. The figures in the table represent the degrees of chalking (water resistance); "5" indicates no chalking (the highest water resistance), and decreasing figures show increasing degrees of chalking (lowering water resistance).

Testing of Light Resistance

Three parts by weight of a pigment sample was mixed with 100 parts of a polyvinyl chloride resin compound having the following composition, the mixture was kneaded on a twin roll at 175° C. for 10 minutes, and the kneaded product was pressed at 175° C. for two minutes under a pressure of 45 Kg/cm² into 1.0 mm thick specimens.

| (polyvinyl chloride resin compound) | parts by wt. |
|---|---|
| PVC resin with number average M.W. of 1650 (Zeon 121; Nippon Zeon Co., Ltd.) | 1000 |
| PVC resin with number average M.Z. of 1100 Zeon 131; Nippon Zeon Co., Ltd.) | 1000 |
| Acrylic Processing aid for PVC resin (Methablene P-551; Mitsubishi Rayon Co., Ltd.) | 40 |
| Tribasic lead sulfate, $3PbO.PbSO_4.H_2O$ | 60 |
| Dibasic lead stearate, $2PbO.Pb(C_{17}H_{35}COO)_2$ | 20 |
| Mono-olein, $C_{17}H_{33}COOCH_2CH(OH)CH_2OH$ | 20 |

A specimen prepared above was subjected to an accelerated exposure test for three hours (12 minutes of precipitation in every 60 minutes of irradiation; black panel temperature: 63°±3° C.) using a carbon-arc, sunshine weatherometer (Model WEL-SUN-HC of Suga Tester Co., Ltd.). The treated specimen was then allowed to stand for 24 hours in a cold and dark place, and the difference in blackening degree from an untreated specimen was evaluated by using a gray scale.

This test is to evaluate the degree of activity exhibited by titanium dioxide in the presence of water under irradiation of near ultraviolet rays. It utilizes the fact that the lead ions contained in a specimen are reduced to metallic lead by the action of titanium dioxide in the presence of mon-olein, thus blackening the specimen.

Weatherability (Accelerated Exposure) Test

A test plate prepared above for the water-resistance test was subjected to an accelerated exposure test for 120 hours (12 minutes of precipitation in every 60 minutes of irradiation; black panel temperature: 63°±3° C.) in the same carbon-arc, sunshine weatherometer was used above. The color of the treated plate was measured by using a differential colorimeter (Model D-25 of Hanter Laboratories, and the color difference before and after the test ($\Delta E$) was calculated.

TABLE 1

| Sample | Water Resistance | Light Resistance | Weatherability (E) |
|---|---|---|---|
| Example | | | |
| 1 | 4 | 4-5 | — |
| 2 | 4 | 4-5 | — |
| 3 | 4 | 5 | — |
| 4 | 4 | 4-5 | — |
| 5 | 4 | 4-5 | — |
| 6 | 4 | 4-5 | — |
| 7 | 4 | 4-5 | — |
| 8 | 5 | 4-5 | 1.1 |
| 9 | 5 | 4-5 | 0.2 |
| 10 | 5 | 5 | 0.2 |
| Comp. Ex. | | | |
| 1 | 3 | — | — |
| 2 | 4 | 1-2 | 1.7 |
| Iriodin | | | |
| 225 | 1 | 1 | 3.7 |
| 103 | 1 | 1-2 | 0.7 |
| 300 | 1 | 5 | — |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a weather-resistant nacreous pigment, comprising hydrolyzing a zirconium or zirconyl compound, in the presence of a hypophosphite and a metal oxide-coated mica flake pigment, whereby a hydrated zirconium oxide is deposited onto the surface of the metal oxide-coated mica flake, and coating onto said mica flake with said hydrated zirconium oxide a hydrated metal oxide of cobalt, manganese or cerium.

2. A process according to claim 1, comprising simultaneously depositing, in an aqueous medium, on the surface of metal oxide coated mica flakes, a mixture of hydrated metal oxides formed by hydrolysis of a zirconyl compound and at least one water-soluble compound of cobalt, manganese or cerium, in the presence of a hypophosphite.

3. A process according to claim 1, comprising depositing in an aqueous medium, on the surface of metal oxide coated mica flakes, a hydrated metal oxide formed by hydrolysis of a water-soluble compound of at least one of cobalt, manganese and cerium; and subsequently depositing a hydrated zirconium oxide by hydrolysis of a zirconium compound in the presence of a hypophosphite.

4. A process according to claim 1, wherein the pigment is a mica flake coated with an oxide of Ti, Fe, Sn, Cr, Zr or a mixture thereof.

5. A process according to claim 4, wherein the pigment is a mica flake coated with rutile $TiO_2$ or with an iron oxide containing a titanium oxide.

6. A process according to claim 1, wherein a salt of hypophosphorous acid and a salt capable of forming zirconium oxide under hydrolysis conditions are dissolved in an aqueous slurry of a metal oxide-coated mica flake pigment, and the salt capable of forming zirconium oxide is hydrolyzed so as to deposit hydrated zirconium oxide onto the surface of the metal oxide-coated mica flake.

7. A process according to claim 6, wherein the salt capable of forming zirconium oxide is $ZrCl_4$, $Zr(NO_3)_4.5H_2O$ $Zr(SO_4)_2.4H_2O$, $ZrOCL_2.H_2O$, $ZrO(NO_3)_2.2H_2O$, $ZrOSO_4.4H_2O$ or $ZrO(CH_3COO)_2$.

8. A process according to claim 6, wherein the salt of hypophosphorous acid is $HPH_2O_2$, $NaH_2PO_2.H_2O$, $(NH_4)H_2PO_2$, $KH_2PO_2$, $Ca(H_2PO_2)_2$, $Mg(H_2PO_2)_2$, $Co(H_2PO_2)_2.6H_2O$, $MN(H_2PO_2)_2.H_2O$, $Zn(H_2PO_2)_2.6H_2O$ or $Pb(H_2PO_2)_2$.

9. A process according to claim 6, wherein the salt capable of forming zirconium oxide is $ZrOCl_2.H_2O$ and the salt of hypophosphorous acid is $NaH_2PO_2.H_2O$.

10. A method of improving the water resistance, light-fastness and dispersibility of a nacreous pigment containing metal oxide-coated mica particles, comprising coating said particles with hydrated zirconium oxide and a hydrated oxide of at least one of cobalt, manganese or cerium, in the presence of a hypophosphite.

11. A process according to claim 1, wherein a silane coupling agent in aqueous solution is added under stirring to a resultant aqueous slurry containing the metal oxide-containing mica flake pigment once hydrated zirconium oxide is deposited on the surface thereof.

12. In a process for the preparation of a paint or glaze composition, comprising combining a nacreous pigment and paint or glaze components, the improvement wherein the nacreous pigment is prepared according to claim 1.

* * * * *